Oct. 15, 1940.                J. CORYDON                2,218,393
                          PROPORTIONING APPARATUS
                          Filed Sept. 15, 1936          2 Sheets-Sheet 1

Inventor:
Jeff Corydon
Ferd Bing
Attorney

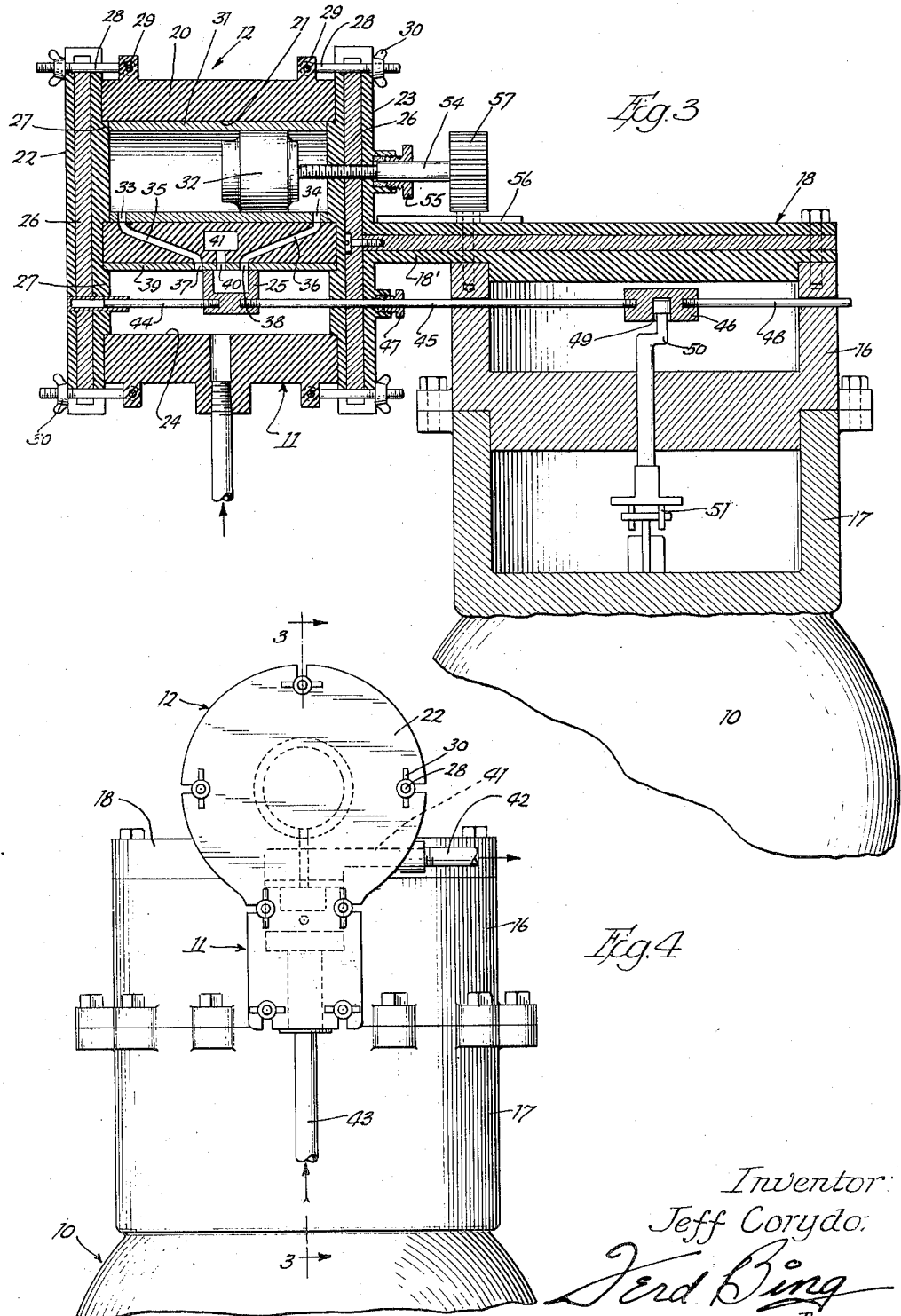

Patented Oct. 15, 1940

2,218,393

UNITED STATES PATENT OFFICE 2,218,393

PROPORTIONING APPARATUS

Jeff Corydon, Providence, R. I.

Application September 15, 1936, Serial No. 100,894

3 Claims. (Cl. 210—40)

The invention relates generally to proportioning apparatus, and more particularly to such apparatus for feeding a liquid reagent into a pipe line in proportion to the flow of a main fluid therethrough.

An important object of the invention is to provide such apparatus which is unitary in character and adapted for installation by simple and easily performed operations and without modification in a large variety of different situations.

Another object is to provide such a universally applicable proportioning apparatus which may be operated solely by pressure so as to avoid the necessity for the use of electric power.

A further object is to provide such apparatus which is adapted for simple and economical manufacture and assembly.

Another object of the present invention is to provide apparatus of this character which is adapted particularly for use in the chlorination of water supplies.

Other objects and advantages will become apparent from the following description, taken in connection with the accompanying drawings, in which:

Fig. 3 is a sectional view taken along the line 3—3 of Fig. 4, and showing the internal construction of the measuring and valving elements of the device.

Fig. 4 is an end elevational view of a portion of the apparatus.

Figure 1:
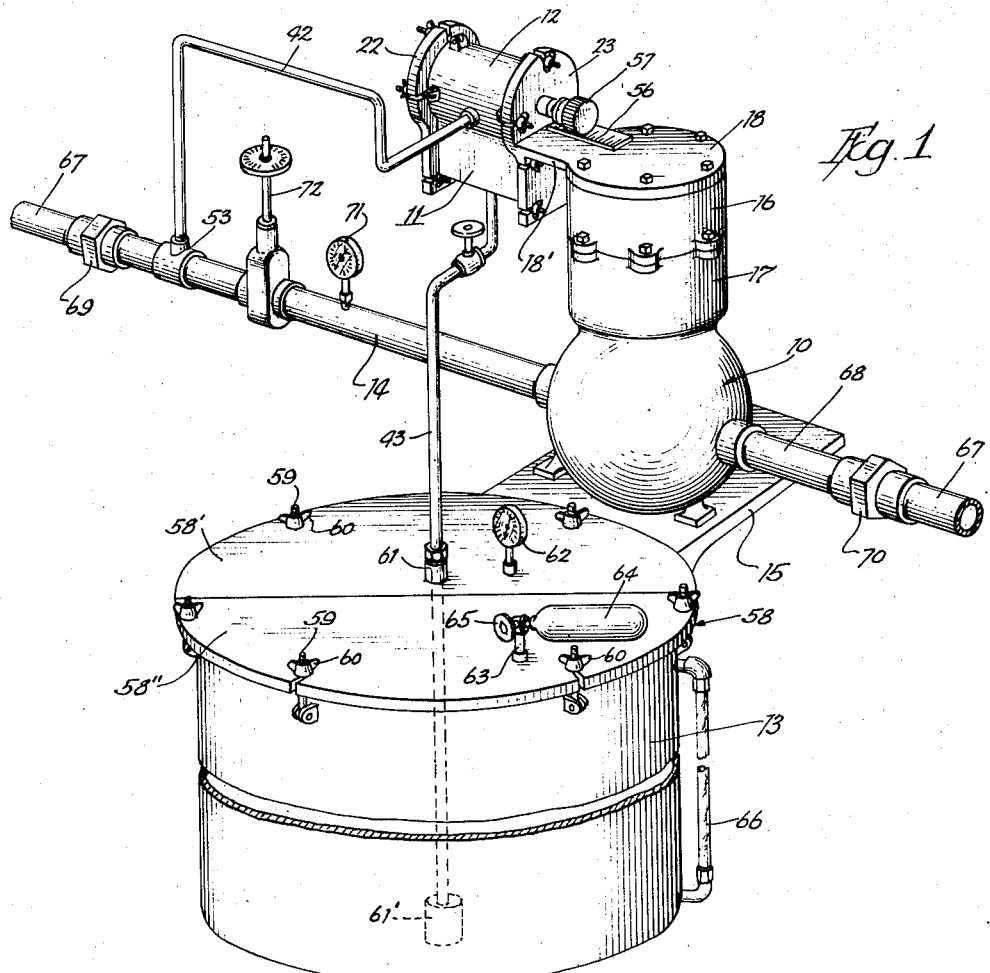
Fig. 1 is a perspective view of a proportioning device embodying the features of the invention.

For purposes of disclosure, I have illustrated in the drawings and will hereinafter describe in detail the preferred embodiment of the invention, with the understanding that I do not intend to limit my invention to the particular construction shown, it being contemplated that various changes may be made by those skilled in the art without departing from the spirit and scope of the appended claims.

In the form chosen for disclosure herein the invention is embodied in a proportioning apparatus of a unitary construction which may be operated without the use of electric motors or the like, and which comprises, generally, a flow measuring device such as a meter 10, adapted to be connected in series with, or as a fractional by-pass with relation to, a main conduit, with the meter serving to operate a control mechanism 11, so as to govern the passage of fluid through a reagent measuring or metering device 12, the reagent being fed from a permanently associated pressure supply tank 13 and being discharged in metered unit charges into a stub pipe 14 which forms a permanent part of the apparatus and is connected on the outlet side of the meter 10.

In order that the apparatus may be unitary in character the meter 10, the valve mechanism 11 and the controlled measuring device 12 are preferably mounted on and carried by the supply tank 13 which is, of course, relatively large and heavy. To this end the tank 13 is of relatively broad upright cylindrical form so as to provide a stable base, and a shelf-like bracket 15 is secured to one side of the tank 13 adjacent the top thereof so that the meter 10 may be secured upon the top of the bracket 15 by conventional means, while the other elements of the reagent measuring mechanism are in the present instance carried on the top of the meter 10.

Thus the present embodiment of the device has a crank housing 16 secured across the top of the usual upwardly opening mounting cup 17 of the meter 10, the housing 16 also being of a cup-like form closed by a removably mounted cover plate 18 which constitutes the mounting frame for the valving and measuring elements of the mechanism. Preferably these elements are supported at one side of the meter on a projecting edge 18' of the mounting plate 18, with the measuring device 12 above the level of the plate 18 and the valve mechanism 11 below the level of the plate and substantially at the level of the crank housing 16.

The present device contemplates its utilization for the feeding of a corrosive reagent such as solutions of calcium hypochlorite, used for the chlorination of water supplies, and because of the corrosive characteristics of this reagent, the various parts of the valve mechanism and measuring mechanism are formed from corrosion resistant materials. To this end many of the parts of the present device are formed from Bakelite, hard rubber or of a suitable resistant metal such as "Hastelloy," and in order that the rubber or Bakelite parts may be clamped together without danger of deformation or breaking, internal reinforcing means of steel or the like is employed in most instances.

In the form illustrated herein, the valve mechanism 11 is of the reciprocating type while the reagent measuring mechanism 12 is of the piston and cylinder type, and the structural parts used to make up these mechanisms are so constructed as to permit economical manufacture as well as convenient assembly or inspection. Accordingly, a molded central body member 20 is provided, formed preferably from hard rubber, and having a cylinder 21 for the measuring device 12 formed therein, extending through the member 20 from end to end, and closed at its ends by end plates 22 and 23 which are removably clamped against the ends of the body members. Preferably the body member 20 has a second passage 24 formed therein so as to provide a valve chest within which a D-type valve member 25 may be reciprocated. This second passage 24, which constitutes the valve chamber or chest, preferably extends parallel to the cylinder 21 and is closed by the lower portions of the end plates 22 and 23, and the end plate 23 is formed integrally with and perpendicular to the overhanging edge 18' of the mounting plate 18 so as to properly position the valve chest beside the crank housing 16.

As herein shown, the hard rubber end plates 22 and 23 have moulded therein reinforcing plates 26 of steel, and on their inner faces are formed with bosses 27 to extend slightly into the cylinder 21 and the valve chamber 24 to aid in positioning and sealing of the parts. The requisite clamping force endwise of the cylinder 21 is, in the present instance, obtained by means of a plurality of swing-type clamping bolts 28 disposed at laterally spaced points about both ends of the body member 20. Thus each clamping bolt 28 is pivoted at one end on a lug 29 cast or molded integrally with the body member 20, while the other end of the bolt is screw threaded and adapted to extend through a suitably positioned opening in the edge of the adjacent end plate to receive a wing nut 30 for clamping purposes.

The cylinder 21 is preferably provided with a cylindrical metallic liner 31 within which a metallic piston 32 may reciprocate without appreciable wear. Both the piston 32 and the liner 31, are, in the present embodiment, formed from "Hastelloy," the liner having lateral ports 33 and 34 therein adjacent its ends to register with passages 35 and 36 leading from the valve chamber 24. At their other ends the passages 35 and 36 register with ports 37 and 38 formed in a "Hastelloy" bearing plate 39 at points spaced longitudinally of the valve chamber. Between two ports 37 and 38 an outlet port 40 is formed in the plate connecting with a discharge passage 41 in the body 20 which in turn discharges through a rubber connecting pipe 42.

Reagent enters the valve chamber 24 under pressure from the tank 13 through a hard rubber tube or pipe 43, and its flow from the chamber to opposite ends of the cylinder is controlled by reciprocation of the D-valve 25. Thus the valve 25 slides against the bearing plate 39 and is supported, guided and actuated by means of rods 44 and 45 which are fixed to opposite ends of the valve 25 in axial alinement to run in alined bearings in the end plates 22 and 23. The bearing in the plate 22 terminates within the end plate, while the other bearing opens through the end plate 23 so that the guide rod 45 may extend through an opening in the adjacent side of the crank housing 16 for connection with a crank block 46. A packing gland 47 is provided about the rod 45 in the plate 23 to prevent leakage, the gland being accessible between the valve housing and the meter for purposes of adjustment. A similar guide rod 48 extends axially from the opposite side of the crank block through a bearing opening in the other side of the housing.

In the crank block 46 there is formed a transverse slot 49 into which the end of an actuating crank 50 extends, the crank being journaled vertically in the bottom of the housing 16 with its lower end projecting into the mounting cup 17 for connection to the meter shaft by means of a pin connecter 51.

It will be evident that the valve 25 is actuated in timed relation to the flow of fluid through the meter 10, and that the reagent under pressure in the valve chamber will alternately be admitted to opposite ends of the cylinder 21. Thus the measured charge of reagent which is discharged from one end of the cylinder when the shifting of the valve permits flow of pressure reagent into the other end will be driven through the port 38 and the pipe 42 to a suitable point of injection 53 at which the injection pipe 42 is connected to the stub pipe 14 of the apparatus. The volume or quantity of reagent discharged at each piston stroke may be varied by means of an adjustment screw 54 threaded axially into the cylinder through the end plate 23. A packing gland 55 is provided about the screw 54, and an indicator scale 56 is affixed to the top of the mounting plate 18 for cooperation with the head 57 of the adjusting screw in indicating the stroke length of the piston.

The reagent tank 13 is preferably formed from steel with a hard or soft rubber lining (not shown), there being a removable cover 58 clamped in place by swing-type clamping bolts 59 and wing nuts 60. As herein shown the cover 58 is formed in two sections 58' and 58", the section 58' being normally left in its clamped position during re-filling of the tank.

Thus the rubber intake pipe 43 extends through a packing nut gland 61 provided in the section 58', and has a foot valve and strainer 61' on its lower end within the tank 13. A pressure gage 62 is mounted on the section 58' to indicate the air pressure in the tank, such pressure being supplied through a check valve fitting 63 mounted on the cover section 58". The required pressure may be provided by attaching a hand pump or other source of air pressure to the fitting 63, or if desired, a small tank 64 of nitrogen, or other gas under pressure, may be attached to the fitting 63 through a suitable reducing valve 65. As herein shown a gage glass 66 is provided on the side of the tank to indicate the level of the reagent therein, the various fittings being formed from a metal which resists corrosion.

Figure 2:
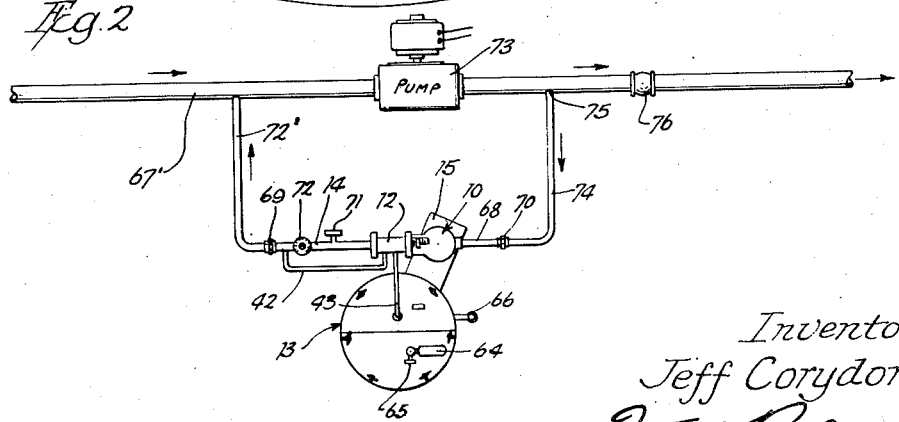
Fig. 2 is a plan view showing on a reduced scale the incorporation of the present device in a water system having a relatively large flow in the main conduit.

The present apparatus, as thus described, is intended and adapted for connection of its meter 10 directly in a main conduit 67 as shown in Fig. 1, or for connection of its meter in a by-pass relationship to a conduit 67' as shown in Fig. 2. To adapt the device for convenient installation in either relationship, the stub pipe 14 on the discharge side of the meter and a stub pipe on the inlet side of the meter, are provided, the pipes having connecting fittings 69 and 70 at their ends. The point of connection 53 of the reagent injection line 42 is located adjacent to the end of the stub pipe 14, while a gage 71 to show the required injection pressure is connected to the pipe 14 between the injection point and the meter. In addition, a throttle valve 72 is provided in the pipe 14 between the gage and the injection point, so that in by-pass installations of the device (Fig. 2), an additional adjustment of the reagent feed rate is afforded.

When the main conduit is a variable or gravity flow (in contrast with a constant rate pumped supply) the entire flow may pass through the meter 10, and in such installations the fittings 69 and 70 are connected into the conduit as shown in Fig. 1.

If the flow in the conduit is of a constant rate such as a pumped supply, the by-pass arrangement of Fig. 2 is used, the fitting 69 being connected by a rubber hose 72' to a point of low pressure in the conduit. Such a point of low pressure is found on the intake side of the pump 73. The other fitting is connected by a rubber hose 74 to the conduit 67' at 75 on the discharge side of the pump, a check valve 76 being preferably interposed in the conduit beyond the point 75.

In the use of the present device, the strength of the reagent solution in the tank 13 plays an important part in rendering the apparatus readily adaptable for a wide variety of different installations and different operating conditions and requirements. When the possible variation of the strength of the solution is considered in connection with the various adjustments provided on the device, it will be seen that the present device may be used to treat water supplies over a widely varying range of total flow.

Thus the tank 13 as herein shown is of a 15 gallon size, and 5 gallons of solution is the normal charge. In preparing this charge of solution in the initial operation of the device, the strength or amount of chemical added to the 5 gallons of water in the tank is estimated and determined in accordance with the total flow of water in conduit, it being desirable to so mix the solution as to provide for operation of the measuring piston 32 at a reasonable and efficient rate.

As a standard method of determining the solution strength, it is my practice to divide the pump flow (in gallons per minute) by twenty to give the number of ounces of calcium hypochlorite to be added to five gallons of water in the tank 13. Thus if the flow is 200 g. p. m., 10 ounces of a chemical such as commercial "HTH" would be added. After clamping the cover 58 in position, the pressure in the tank is built up to double the pressure indicated on the gage 71. The piston 32 then starts to reciprocate so as to feed reagent. In a by-pass type of installation such as that shown in Fig. 2, the throttle valve 72 is adjusted, preferably before closure of the cover 58, to set the stroking rate of the valve rod 45 at 5 complete strokes per minute, and after there has been a substantial period of reagent injection, a residual chlorine test is made on treated water taken from a suitable point in the conduit.

If the residual is too low, the throttle valve 72 may be opened slightly so as to increase the feeding rate of the measuring piston. The same sort of adjustment may also be used to correct the treatment in case the residual is shown to be too high, but I prefer to maintain the stroking rate of the piston at 5 per minute or over, and to employ the adjusting screw 54 to reduce the stroke length of the piston 32.

When the apparatus is installed directly in the main conduit 67 as shown in Fig. 1, the throttle valve 72 is set in its open position, or may be eliminated if desired. The proper degree of chlorination or treatment is in such cases attained through variation in solution strength, or by adjustment of the stroke length.

In the event that large quantities of reagent are required for a particular installation, the only change required in the apparatus is the substitution of a deeper tank 13; and such a deeper tank may be used in case it is desirable to obtain operation over long periods without servicing of the device. To a limited degree, an increase in solution strength may also be employed to meet the requirements of a large flow or long operating period.

The present device is, in any of its adaptations, easily installed, and it can be used in any place where there is a flow of water through a conduit, regardless of how such flow is induced. Its parts are simple in character, and by reason of its wide range of adaptability, it can be produced and sold at a reasonable figure.

I claim as my invention:

1. Proportioning apparatus of the character described comprising, in combination, a body member formed from hard rubber to provide two parallel passages extending endwise therethrough, a pair of end plates adapted to engage the ends of said body member to close the ends of said passages, each of said end plates comprising a rigid metallic reinforcing plate having a protective coating of hard rubber, means clamping said plates in sealing relation to said body member, a valve member reciprocable in one of said passages, a piston reciprocable in the other of said passages, and ducts between said passages controlled by said valve member.

2. In a proportioning device, the combination of a meter, a housing carried by said meter, a cover for said housing having a projecting edge, an end plate secured to said edge in perpendicular relation and projecting above and below said edge, a body member having two passages therethrough, said body member abutting said end plate with one passage located above and the other below said cover and arranged so that said plate closes said passages at one end of the body member, an end plate closing said passages at their other ends, means clamping said end plates against said body, a valve member in the lower one of said passages, means in said housing connected to said valve member for actuating said valve member, a piston reciprocable in the upper one of said passages, and said body member having ducts connecting said lower passage to opposite ends of said upper passage controlled by said valve member to govern the flow of fluid to and from said opposite ends of said upper passage.

3. A proportioning device comprising, in combination, a tank adapted to contain liquid reagent under pressure, a meter mounted in fixed relation to said tank, said meter having inlet and discharge passages, a pipe connected to the discharge passage of said meter, a pipe connected to said inlet passage for supplying fluid to said meter, a piston and cylinder measuring device mounted in fixed relation to said meter, a control valve mounted in fixed relation to and actuated by said meter, said control valve having a permanent supply connection with said tank, and said valve in its movement being adapted to connect said supply connection alternately with opposite ends of said cylinder, means providing an outlet connection from said valve and controlled by said valve to alternate with said supply connection in communication with the cylinder ends, said outlet connection discharging into one of said pipes, a throttle valve in one of said pipes, and a pair of pressure gages, one connected to said tank and the other to said one of said pipes.

JEFF CORYDON.